United States Patent
Olsson

(10) Patent No.: US 7,966,117 B2
(45) Date of Patent: Jun. 21, 2011

(54) METHOD FOR CONTROLLING ROTATION SPEED

(75) Inventor: Karl Erik Olsson, Stora Sundby (SE)

(73) Assignee: Volvo Construction Equipment AB, Eskilstuna (SE)

(*) Notice: Subject to any disclaimer, the term of this patent is extended or adjusted under 35 U.S.C. 154(b) by 507 days.

(21) Appl. No.: 12/065,425

(22) PCT Filed: Feb. 15, 2006

(86) PCT No.: PCT/SE2006/000208
§ 371 (c)(1),
(2), (4) Date: Feb. 29, 2008

(87) PCT Pub. No.: WO2007/035146
PCT Pub. Date: Mar. 29, 2007

(65) Prior Publication Data
US 2008/0257629 A1    Oct. 23, 2008

(30) Foreign Application Priority Data
Sep. 20, 2005  (WO) .................. PCT/SE2005/001375

(51) Int. Cl.
*B60K 28/16* (2006.01)

(52) U.S. Cl. .............. 701/72; 180/197; 701/82; 701/84; 701/90

(58) Field of Classification Search .................... 701/72, 701/67, 82, 84, 90, 85, 70, 86; 180/197, 180/65.2; 303/141
See application file for complete search history.

(56) References Cited

U.S. PATENT DOCUMENTS

| | | | |
|---|---|---|---|
| 4,867,287 A * | 9/1989 | Hayashi ....................... 192/21.5 |
| 4,973,295 A | 11/1990 | Lee | |
| 5,017,183 A | 5/1991 | Teraoka | |
| 5,163,530 A * | 11/1992 | Nakamura et al. ............. 180/197 |
| 5,178,231 A * | 1/1993 | Watanabe et al. ............. 180/248 |
| 5,291,979 A * | 3/1994 | Iizuka ............................. 192/92 |
| 5,322,150 A * | 6/1994 | Schmidt-Brucken et al. .............................. 477/176 |
| 5,927,421 A | 7/1999 | Fukada | |
| 6,154,702 A | 11/2000 | Fodor | |
| 6,584,398 B1 * | 6/2003 | Erban ............................. 701/82 |

(Continued)

FOREIGN PATENT DOCUMENTS

DE         10113103 A1      9/2002

(Continued)

OTHER PUBLICATIONS

International Search Report for corresponding International Application PCT/SE2006/000208.

(Continued)

*Primary Examiner* — Thomas G Black
*Assistant Examiner* — Marthe Marc Coleman
(74) *Attorney, Agent, or Firm* — WRB-IP LLP

(57) ABSTRACT

A method for controlling rotation speed of at least one rotary element in the driveline of a vehicle is provided. At least one operating parameter is detected repeatedly, which operating parameter corresponds to an actual value of a torque in the driveline, which is delivered to the rotary element. A desired value of a torque to the rotary element is determined on the basis of friction against the ground of at least one of the ground engagement elements of the vehicle, which ground engagement element is driven via the rotary element. The rotation speed of the rotary element is controlled so that the actual value moves toward the desired value.

32 Claims, 7 Drawing Sheets

U.S. PATENT DOCUMENTS

| | | |
|---|---|---|
| 6,991,584 B2 * | 1/2006 | Cowan .......................... 477/110 |
| 2002/0002433 A1 | 1/2002 | Matsuno |
| 2003/0217876 A1 * | 11/2003 | Severinsky et al. .......... 180/65.2 |
| 2003/0221889 A1 | 12/2003 | Sauter |
| 2004/0133328 A1 * | 7/2004 | Bastian et al. .................. 701/67 |
| 2005/0027425 A1 | 2/2005 | Wang |
| 2005/0027427 A1 | 2/2005 | Nagaya |
| 2005/0109549 A1 | 5/2005 | Morrow |

FOREIGN PATENT DOCUMENTS

| | | |
|---|---|---|
| DE | 4042581 B4 | 4/2005 |
| EP | 1477705 A1 | 11/2004 |
| GB | 2204368 A | 11/1988 |
| WO | 03006846 A1 | 1/2003 |

OTHER PUBLICATIONS

Supplementary European Search Report for corresponding European App. EP 05 78 6159.

Supplementary European Search Report for corresponding European App. EP 06 71 6897.

Supplementary European Search Report for corresponding European App. EP 06 71 6898.

* cited by examiner

METHOD FOR CONTROLLING ROTATION SPEED

BACKGROUND AND SUMMARY

The present invention relates to a method for rotation speed control of a rotary element in the drive line of a vehicle.

The term "rotary element" means a shaft, such as a longitudinal drive shaft (for example propeller shaft) or a transverse drive shaft (that is to say wheel axle) or other power transmission element forming part of the drive line and adapted for rotation.

The term "drive line" means the entire power transmission system from the engine of the vehicle to the ground engagement elements. The drive line therefore includes clutch, gearbox (and any transfer gearbox present), propeller shaft (or propeller shafts), transverse drive shafts etc. Hydraulic, electric and other drive systems are also included within the term drive line.

The term "ground engagement elements" includes wheels, caterpillar tracks etc.

The invention can be applied to wheel-borne vehicles, track-borne vehicles and vehicles running on rails. Primarily wheel-borne vehicles are intended. The invention can also be applied to passenger cars, trucks, buses and other road vehicles but is primarily intended for cross-country vehicles, such as four-wheel drive passenger cars, and working vehicles, such as frame-steered dumpers, wheel loaders, excavators etc. The invention is particularly applicable in vehicles with a plurality of driven axles and will below be described for a frame-steered dumper for the purpose of exemplification.

A fundamental problem for all vehicles with drive at a number of ground contact points is how the driving power is distributed. It is desirable to control the rotation speeds of the wheels so that the slip in the longitudinal direction is the same at all ground contact points because this results in excessive slip at individual ground contact points being prevented. Slip is the standardized difference between the speed of the wheel at the ground contact point and the speed of the ground at the same point.

One way of bringing about the desired identity of longitudinal slipping would be to connect the drive of all the wheels mechanically. However, this would not work during cornering. During cornering, the ground moves at different speed at the various ground contact points. The ground under the outer wheels moves at higher speed than the ground under the inner wheels because the outer wheels have a greater distance to cover in the same time as the inner wheels. During cornering, the ground under the front wheels also moves at higher speed than the ground under the rear wheels.

The problem of distributing tractive power in an effective way during cornering as well is conventionally solved by dividing the torque in a given, fixed ratio with the aid of a differential. The rotation speed is then controlled by the speed of the ground at the various ground contact points and by the slip. However, the slip cannot be controlled. If the product of vertical load and ground friction does not correspond to the torque ratio in the differential, the slip can increase unlimitedly, the wheels slip and the total tractive power transmitted is limited by the slipping ground contact.

The problem of uncontrolled slip is usually reduced by various measures for braking the slip, for example by using what is known as a differential lock. The differential lock conventionally comprises a claw coupling which locks the differential mechanically. The disadvantage of differential locks is that the speed difference during cornering is offset as slip at the ground contact points concerned. This results in great constrained torques which shorten the life of the drive line, give rise to losses and cause great tire wear.

WO03/006846 describes a large number of different drive line solutions which afford opportunities for remedying the abovementioned problems during cornering.

It is desirable to provide a method for controlling the rotation speed of a rotary element in the drive line of a vehicle in a way which results in a longer life of the drive line and/or lower losses in the form of fuel consumption and/or tire wear.

A method according to an aspect of the present invention is provided for controlling rotation speed of at least one rotary element in the drive line of a vehicle, at least one operating parameter being detected repeatedly, which operating parameter corresponds to an actual value of a torque in the drive line which is delivered to the rotary element, a desired value of a torque to the rotary element being determined on the basis of friction against the ground of at least one of the ground engagement elements of the vehicle, which ground engagement element is driven via the rotary element, and the rotation speed of the rotary element being controlled so that the actual value moves toward the desired value.

In this way, it is possible actively to control the torque which is distributed from the drive source of the drive line to a specific ground engagement element or drive shaft as required. It is therefore possible to vary the torque distribution to different ground engagement elements or drive shafts depending on prevailing operating conditions. The term "operating condition" is to be understood in a broad sense here and can include, for example, operating parameters detected in the vehicle, current driving situation/task, geographical position, environment/weather etc.

According to a preferred embodiment, a vertical load from the vehicle toward the ground at the ground contact point of the ground engagement element is determined on the basis of the detected operating parameter, and the vertical load determined is used for calculating the desired value of the torque. To be precise, the vertical load provides an indication of the friction against the ground. According to a development, the speed of the vehicle is detected and is used for calculating the desired value of the torque.

The driving torque is preferably controlled so that the coefficients of friction at the ground contact points are essentially the same.

According to another preferred embodiment, the actual value of the torque is detected by a regulating motor which is operationally coupled to the rotary element. The regulating motor is preferably adapted to supply a calculated rotation speed increase to the rotary element when necessary.

According to another preferred embodiment, a regulating unit controls the rotation speed of the rotary element so that the rotation speed which is supplied to two different wheel engagement elements is varied. The regulating unit preferably comprises the regulating motor according to the preceding embodiment.

According to another preferred embodiment, the rotation speed of the rotary element is controlled on the basis of the torque determination, and the slip at the ground contact point of the ground engagement element is allowed to vary.

According to another preferred embodiment, the rotation speed of the rotary element is controlled on the basis of a determined torque distribution between at least two of the ground engagement elements of the vehicle. By dividing the drive line into a number of branches from the drive source to the ground engagement elements, it is possible to determine a distribution of the torque between the different branches and to control the rotation speed of the rotary element(s) correspondingly. The torque distribution is suitably determined according to prevailing operating conditions.

According to another preferred embodiment, rotation speed control is carried out between a front drive shaft and a rear drive shaft in the vehicle so that the rotation speed of the front drive shaft is increased in relation to the rotation speed of the rear drive shaft during cornering. The tractive power on the front drive shaft in relation to the vertical load on the front drive shaft is preferably controlled to a given ratio relative to the tractive power on the rear drive shaft in relation to the vertical load on the rear drive shaft.

According to a preferred example, the rotation speed is controlled so that the ratio between the tractive power and the wheel pressure is essentially the same at the ground contact points.

According to a further embodiment, which is an alternative or complement to the preceding embodiment, rotation speed control is carried out between a right and a left ground engagement element so that the rotation speed of the ground engagement element with the larger curve radius is increased in relation to the rotation speed of the ground engagement element with the smaller curve radius during cornering.

According to a further preferred embodiment, a first control model is defined, with which at least one limit for permitted slip of the ground engagement element of the vehicle at its ground contact point is determined, and a rotation speed value corresponding to the slip determined is calculated, a second control model being defined, with which the torque to said ground engagement element is determined as above on the basis of the friction against the ground, and the rotation speed of the rotary element being controlled according to the result of the second control model as long as the slip at said ground contact point determined with the first control model is on the permitted side of said limit.

There are therefore two different regulating principles via the first and second control model.

Furthermore, the first control model provides a limitation of permitted slip, and the function of the conventional differential lock is thus achieved. However, a certain rotation speed difference is permitted between the rotating elements which are regulated relative to one another with the first control model.

One of said control models is preferably selected on the basis of the prevailing operating conditions of the vehicle for controlling the rotation speed of the rotary element.

Selection of the control model is preferably carried out repeatedly, either continuously or intermittently, and automatically.

To be precise, the first control model for controlling the rotation speed of the rotary element is used when the second control model gives a calculated value of said rotation speed which means that the calculated slip according to the first control model lies outside said limit, the rotation speed of the rotary element being controlled so that it follows said limit.

Further preferred embodiment and advantages thereof emerge from the description below, the figures and the claims.

BRIEF DESCRIPTION OF FIGURES

The invention will be described in greater detail below with reference to the embodiments shown in the accompanying drawings, in which.

DETAILED DESCRIPTION

Figure 1:
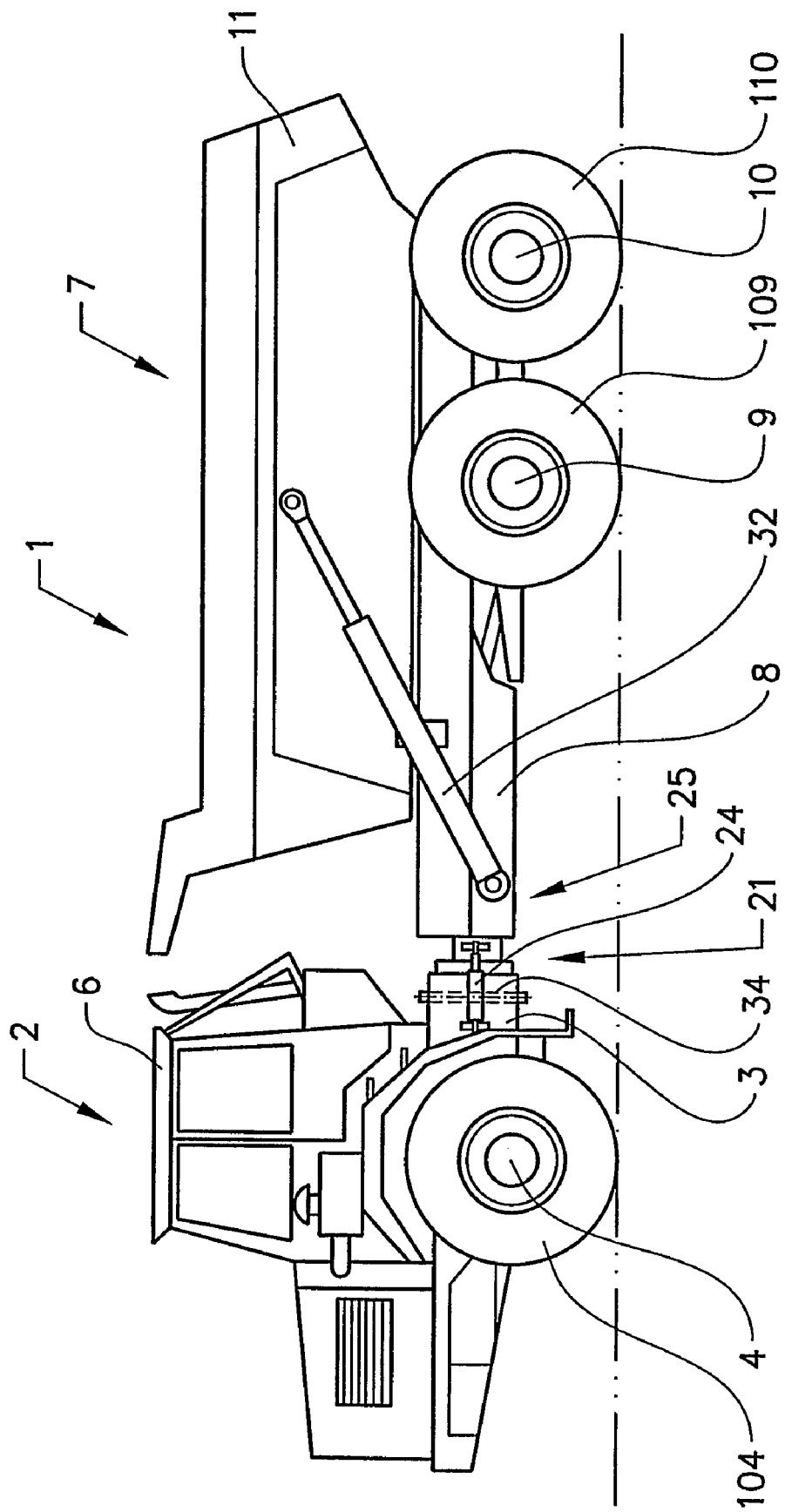
FIG. 1 shows a frame-steered dumper in a side view.

FIG. 1 shows a frame-steered dumper 1 in a side view. The frame-steered dumper comprises a front vehicle section 2 comprising a front frame 3, a front wheel axle 4 and a cab 6 for a driver. The frame-steered dumper 1 also comprises a rear vehicle section 7 comprising a rear frame 8, a front wheel axle 9, a rear wheel axle 10 and a tiltable platform body 11.

The front and rear wheel axles 9, 10 of the rear vehicle section 7 are connected to the rear frame 8 via a bogie arrangement 12, see FIG. 3, and will below be referred to as front bogie axle 9 and rear bogie axle 10.

Each of the front wheel axle 4, the front bogie axle 9 and the rear bogie axle 10 comprises a left ground engagement element 104, 109, 110 and a right ground engagement element 204, 209, 210 in the form of wheels.

The front frame 3 is connected to the rear frame 8 via a first rotary joint 21 which allows the front axle 3 and the rear axle 8 to be rotated relative to one another about a vertical axis 34 for steering (turning) the vehicle. A pair of hydraulic cylinders 24 are arranged on respective sides of the rotary joint 21 for steering the vehicle. The hydraulic cylinders are controlled by the driver of the vehicle via a wheel and/or a joystick (not shown).

Figure 3:
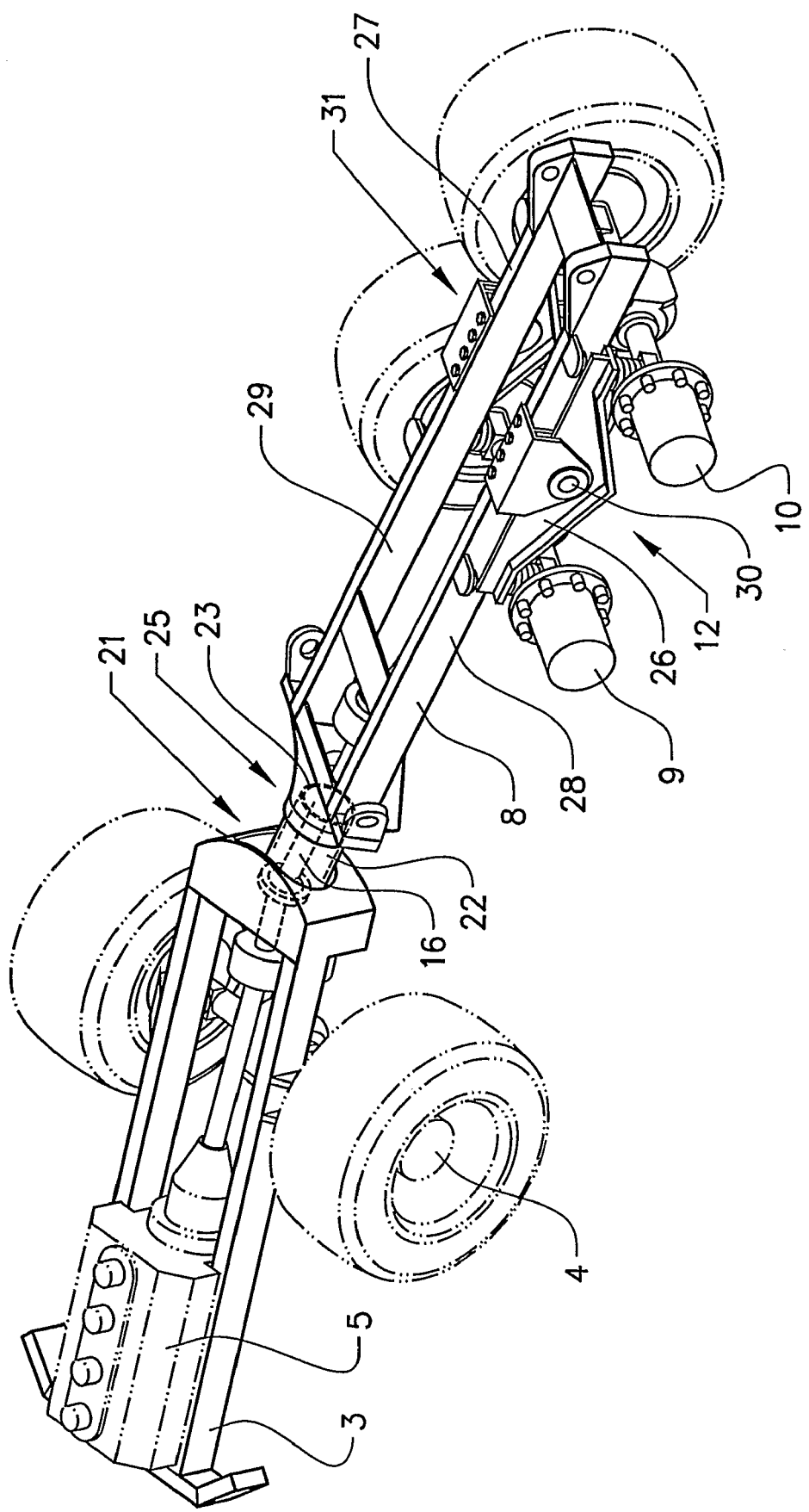
FIG. 3 shows a front frame and a rear frame in the frame-steered dumper.

A second rotary joint 25 is adapted in order to allow the front frame 3 and the rear frame 8 to be rotated relative to one another about an imaginary longitudinal axis, that is to say an axis which extends in the longitudinal direction of the vehicle 1, see FIG. 3.

Figure 2:
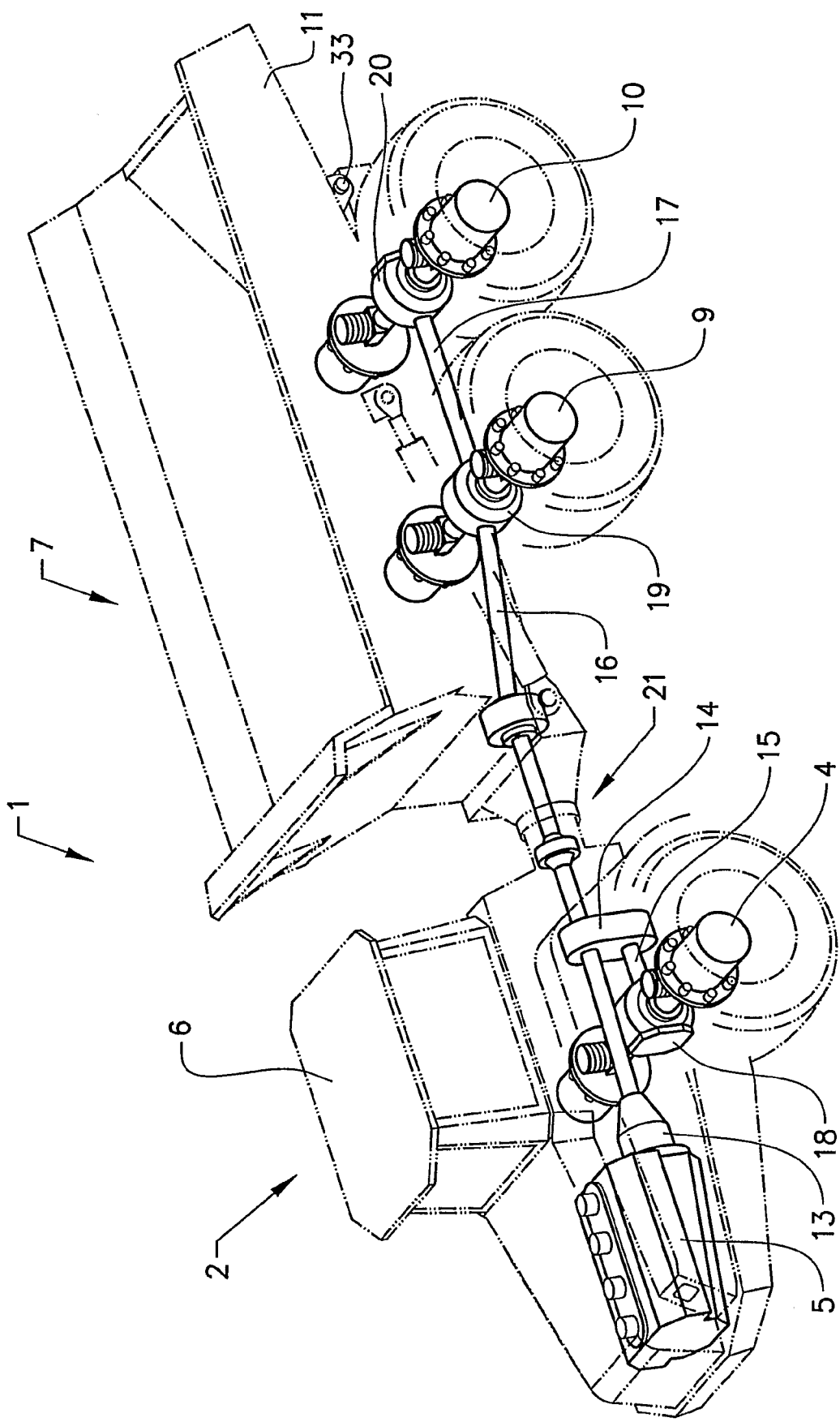
FIG. 2 shows the drive line of the frame-steered dumper in a partly cutaway perspective view.

The platform body 11 is connected to the rear frame 8 via an articulation 33, see FIG. 2, on a rear portion of the rear frame 8. A pair of tilting cylinders 32 are with a first end connected to the rear frame 8 and with a second end connected to the platform body 11. The tilting cylinders 32 are positioned one on each side of the central axis of the vehicle in its longitudinal direction. The platform body 11 is therefore tilted in relation to the rear frame 8 on activation of the tilting cylinders 32.

FIG. 2 shows diagrammatically the drive line of the vehicle 1. A power source in the form of an internal combustion engine, in this case a diesel engine 5, is adapted for propulsion of the vehicle 1. The drive line comprises a main gearbox 13 in the form of an automatic gearbox, which is operationally connected to an output shaft from the engine 5. The main gearbox 13 has six forward gears and two reverse gears, for example. The drive line also comprises an intermediate gearbox 14 for distributing driving power between the front axle 4 and the two bogie axles 9, 10.

A first, second and third drive shaft 15, 16, 17 (propeller shafts) extend in the longitudinal direction of the vehicle and are each operationally connected to the transfer gearbox 14 and a central gear 18, 19, 20 in each of the wheel axles 4, 9, 10.

A pair of transverse drive shafts (stick axles) extend in opposite directions from the respective central gear.

Each of the transverse drive shafts drives one of said wheels.

FIG. 3 shows the front frame 3 and the rear frame 8 more in detail in a perspective view. The second rotary joint 25 comprises two tubular or circular cylindrical parts 22, 23 of complementary shape relative to one another. The first tubular part 22 is anchored to the front frame 3, and the second tubular part 23 is anchored to the rear frame 8. The first tubular part 22 is received slidably in the second tubular part 23 so that the front frame 3 can be rotated in relation to the rear frame 8 about said imaginary longitudinal axis. The second longitudinal drive shaft 16 extends through the second rotary joint 25.

In FIG. 3, the front frame 3 is in a position displaced about the first rotary joint 21 relative to the rear frame 8. Furthermore, the front frame 3 is in a position displaced about the second rotary joint 25 relative to the rear frame 8.

The bogie axles 9, 10 are mounted in the rear frame 8 via a right and left bogie element 26, 27, which elements extend essentially in the longitudinal direction of the vehicle. The bogie elements 26, 27 can be rigid, in the form of beams, or slightly flexible in the form of resilient elements, for example leaf springs. Each of the bogie elements 26, 27 is arranged along an adjacent longitudinal frame beam 28, 29 in the rear frame 8 and is mounted rotatably therein via a rotary joint 30, 31. The rotary joint 30, 31 is arranged between the bogie axles 9, 10 in the longitudinal direction of the vehicle. The bogie arrangement 12 allows a relative diagonal movement between the bogie elements 26, 27 and thus a state in which the bogie elements are positioned with different inclination in relation to a horizontal plane.

Figure 4:
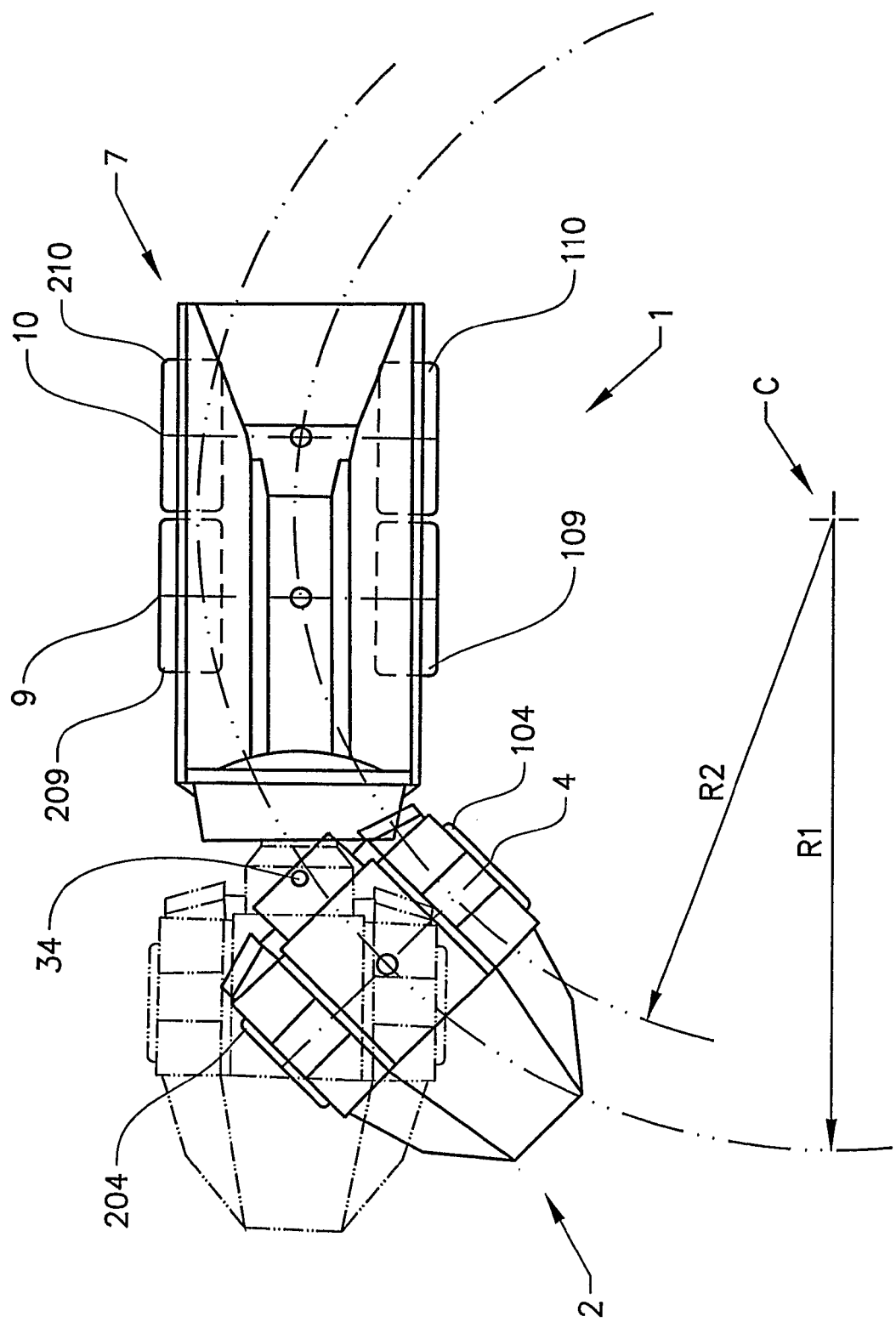
FIG. 4 shows a view from above of the frame-steered dumper during cornering.

FIG. 4 shows the frame-steered dumper 1 in a view from above during cornering. The front vehicle section 2 is therefore rotated about the first rotary joint 21 in relation to the rear vehicle section 7. As the distance between each wheel axle 4, 9, 10 and a vertical pin 34 which forms the joint between the front and rear vehicle sections 2, 7 differs greatly, the wheels will follow different turning radii during cornering. The front wheel axle 4 will follow the turning radius R1, while the bogie axles 9, 10 will follow the turning radius R2. As the turning radius R1 of the front wheel axle 4 is considerably larger than the turning radius R2 of the bogie axles 9, 10, the wheels 104, 204 on the front wheel axle 4 have to cover a considerably greater distance than the wheels 109, 209 and 110, 210 on the two bogie axles 9, 10.

Furthermore, the external wheels have to rotate faster than the internal wheels in a bend. The driven wheels therefore have to rotate at different speed. Furthermore, the front wheels have to rotate faster than the rear wheels owing to the different radii for the front axle 4 and the bogie axles 9, 10.

In order to prevent these differences giving rise to constrained torque in the drive line from the engine 5 to the wheels concerned, it is necessary to regulate the rotation speed of the front wheel axle 4 in relation to the bogie axles 9, 10 and between internal and external wheels during cornering.

Figure 5:
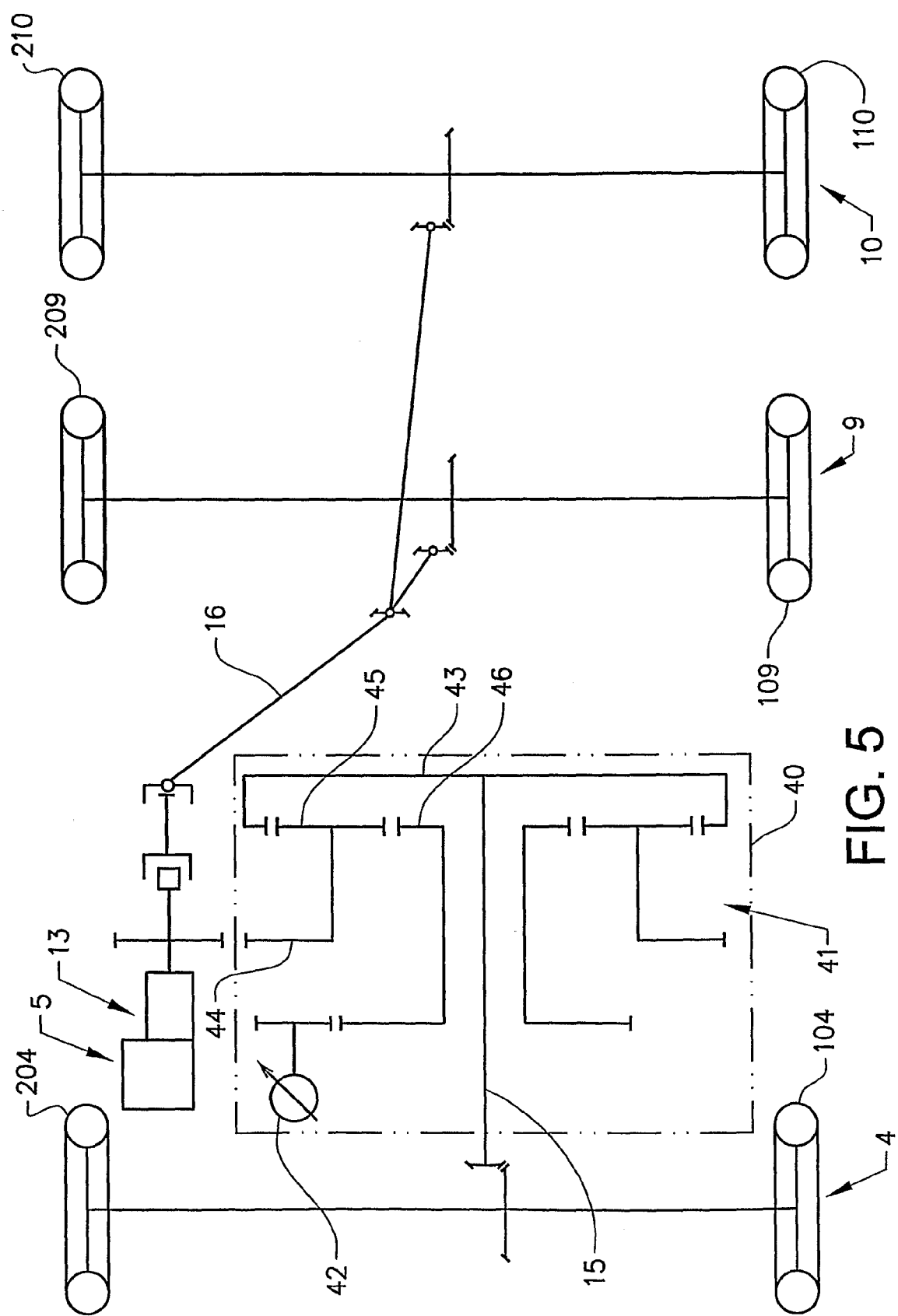
FIG. 5 shows diagrammatically the drive line of the frame-steered dumper comprising a regulating unit for regulating the rotation speed between a front and a rear axle.

FIG. 5 shows diagrammatically the drive line of the frame-steered dumper 1 according to a first embodiment. A regulating unit 40 is adapted for regulating the rotation speed of the front axle 4 in relation to the rotation speed of the bogie axles 9, 10. To be precise, the regulating unit 40 is adapted for regulating the gear ratio between the front axle 4 and the bogie axles 9, 10. The regulating unit 40 is adapted to regulate the rotation speed of a rotary element in the drive line in the form of the first longitudinal drive shaft 15 in relation to the rotation speed of the second longitudinal drive shaft 16. In other words, only that branch of the drive line which transmits driving power to the front wheel axle 4 is regulated.

The regulating unit 40 comprises a continuously variable transmission 41, which is operationally coupled to the first longitudinal drive shaft 15, and a regulating motor 42. The regulating motor 42 is operationally coupled to the continuously variable transmission 41 in order to act on its gear ratio. A gear ratio from the diesel engine 5 to the front wheel axle 4 is therefore regulated by regulating the regulating motor 42.

The continuously variable transmission 41 transmits driving power from the engine 5 directly to the front axle 4 without acting on the ratio in a basic position, suitably when driving straight ahead. The regulating unit 40 thus works with minimum energy loss in the operating state which is used most frequently. During cornering, the regulating motor 42 is controlled to act on the gear ratio in the continuously variable transmission 41.

The continuously variable transmission 41 comprises a planetary gear, and an internal ring gear 43 is connected in a rotationally fixed manner to the first longitudinal drive shaft 15. The planetary gear 41 also comprises a planet carrier 44, at least one planet wheel 45, which is mounted on the planet carrier, and a sun gear 46. The planet wheels 45 interact with the internal ring gear 43 and the sun gear 46 via tooth engagement. The planet carrier 44 is operationally coupled to the main gearbox 13 and forms an input power element to the planetary gear 41. The internal ring gear 43 therefore forms an output power element to the front axle 4. The regulating motor 42 is operationally coupled to the sun gear 46.

The regulating motor 42 comprises in this case a hydraulic motor. A pump in a hydraulic circuit (not shown) provides the hydraulic motor with pressurized hydraulic fluid from a container. The pump is suitably driven by the diesel engine 5 in a conventional way. The regulating motor 42 is suitably of the type with continuously variable displacement. A control unit is electrically coupled to the regulating motor 42 for regulating the gear ratio in the planetary gear 41.

The drive line can be said to be divided into a number of interconnected transmission branches, a first transmission branch of which transmits tractive power to the front axle 4, and a second transmission branch of which transmits tractive power to the bogie axles 9, 10. The regulating unit 40 is adapted for varying the ratio in the first transmission branch.

A method for regulating the rotation speed of the first longitudinal drive shaft 15 for the purpose of distributing the torque from the diesel engine 5 to the wheels will be described below.

The torque is therefore transmitted from the diesel engine 5 to the wheels via the mechanical transmission system which comprises the longitudinal drive shafts 15, 16, 17 and transverse drive shafts 4, 9, 10. The regulating unit 40 is adapted to act on the distribution of the torque in certain driving situations, such as cornering. To be precise, the regulating unit 40 provides a rotation speed increase to the front axle 4 corresponding to the speed increase the ground under the front wheels has in relation to the ground under the rear wheels during cornering. Regulation preferably takes place in relation to a reference rotation speed, for example the input rotation speed to the regulating unit 40, which is operationally connected to the output shaft from the main gearbox 13.

A first control model and a second control model are defined for rotation speed regulation. The first control model defines a limit for permitted slip at one of the ground contact points of the vehicle. The front wheels 104, 204 form the ground contact point in this case. The second control model is used for regulating the rotation speed of the longitudinal drive shaft 15 as long as slip at said ground contact point calculated with the first control model is on the permitted side of said limit. In other words, a theoretical corridor for the slip is defined with the first control model, and rotation speed regulation is carried out with the aid of the second control model as long as the calculated slip at the ground contact point lies within the corridor.

According to an example, the reference rotation speed is determined for a part of the drive line which is on the opposite side of said rotary element (the front axle 4) in relation to the front wheels 104, 204. Control of the rotation speed with the first control model is carried out in relation to this reference rotation speed. As mentioned above, a rotation speed of a rotary element in said drive line part (the input rotation speed to the regulating unit 40) is detected, and this detected rotation speed is used as said reference rotation speed.

Figure 6:
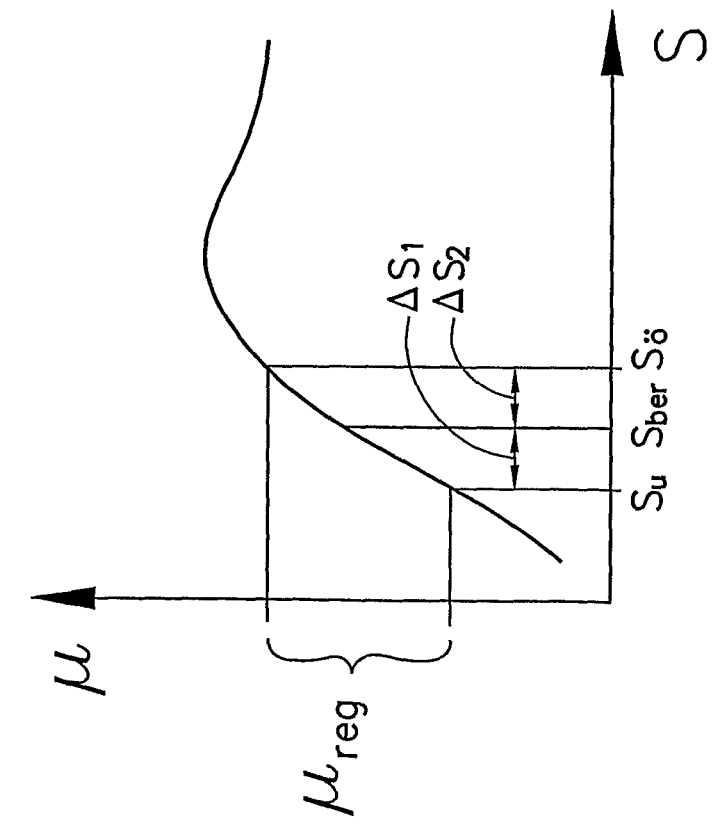
FIG. 6 shows a graph which illustrates the method for rotation speed regulation.

FIG. 6 shows a graph which illustrates the rotation speed regulation method. Slip (s) is indicated on the x axis, and the friction (μ) at the ground contact point is indicated on the y axis. A lower limit (Su) and an upper limit (So) are defined with the aid of the first control model for a permitted calculated slip (Sber) for a given steering angle. As long as the slip calculated with the first control model lies within these limits, the second control model is used for rotation speed regulation, that is to say within the range μreg.

When the second control model is used, the rotation speed of the longitudinal drive shaft 15 is regulated so that a desired torque is delivered to the front wheels 104, 204 and the slip at said ground contact point is allowed to vary. The second control model means that said rotation speed is regulated with regard to the friction against the ground. The driving power is distributed in suitable proportion to output torque from the main gearbox 13 and related to the current vertical loading of the regulated ground contact point. The torque ratio can thus be changed continuously (or intermittently) and automatically in order to compensate for changed conditions.

In simplified terms, the theory behind the second control model (friction regulation) can be explained as follows: output rotation speed from the regulating unit 40 influences the slip at the ground contact point of the front wheels. This determines how much friction is utilized via wheel and surface characteristics. The vertical load of the vehicle provides the longitudinal force and with it the torque at the output of the regulating unit 40. The controlled torque is detected via the torque of the regulating motor 42 and adapted with a rotation speed change to the desired value of the output torque, which is determined by prevailing conditions. The system is a feedback system. Regulation in the case of utilized friction control therefore takes place with a closed system, which does not require that parameter values, measurement signals and calculation algorithms are entirely correct, but the risk of constrained torques is eliminated because the slip is free to adapt to the regulated longitudinal force.

According to the method, regulation with regard to friction (according to the second control model) is therefore allowed to be controlling within limits which are determined by regulating slip (according to the first control model). Problems associated with only slip control and only friction control are thus eliminated. The range between the limits at which regulation of slip becomes controlling is determined by the increase in losses which can be accepted. Quite simply, a permitted deviation, measured in slip, from the calculated ideal slip values at the contacts which are compared is determined.

The range of the limits can be adjustable (for example by the driver) in order to adapt the method to different ground conditions. The limits can also be changed automatically when a certain application becomes active. This means that different applications have different limits, which of course do not have to lie symmetrically around a theoretical central position. The range of the limits ($\delta S1$ and $\delta S2$) can therefore vary in size.

The steering angle of the vehicle is therefore detected and is used in the first control model for rotation speed regulation. In the first control model, a value is also set for a permitted deviation (see $\delta s$ in FIG. 6) of the slip from a base value, which base value is dependent on the steering angle ($\phi$) of the vehicle, and said limit is calculated as a function of the deviation value and the base value. The deviation value is varied depending on the ground conditions. A value for the rotation speed increase is then calculated on the basis of the steering deflection (steering angle) detected and the deviation value.

A preferred embodiment of the second control model (friction control) is described below.

The total driving torque M of the vehicle depends on engine torque and gear position which are both available as measured values.

Utilized friction is the quotient Fx/Fz, where Fx is driving power (or braking power) and Fz is axle pressure. The lowest energy loss in the transmission to ground is considered to exist when the slip is the same at the two ground contact points concerned (in this case at the ground contact point of the front axle 4 relative to one of the ground contact points of the bogie axles 9, 10).

The quotient friction/slip depends on the vertical force $$\mu = c*Fz*S = Fx/Fz, \text{ where}$$

S is slip on a driving wheel, and
c is a constant which can be varied for different surfaces.
This gives Fx=c*S*Fz''2
The slip, S, is:

$$S = (r*w - V)/(r*w) = 1 - V/(r*w), \text{ where}$$

V is the speed of the ground under the front or rear axle. This value can be calculated when the speed and steering deflection (steering angle) of the vehicle are known,
r is the rolling radius of the wheel, and
w is the rotation speed of the wheel.

A given utilized friction Fx/Fz therefore gives different slip at different lengths of the contact area, formulated here as vertical force. The constant c depends on the length of the contact area and consequently varies with the air pressure. The one Fz in Fz''2 takes account of the fact that the length of the contact area increases with increased vertical load. The other Fz is the usual condition that the frictional force increases with the contact force. Wheels with lower air pressure have a longer contact area at the same load, which increases the constant c. If the air pressure follows the vertical force closely, the contact area and thus the quotient Fx/Fz become the same.

Torque is proportional to tractive power and M=M1+M2=M1(1+M2/M1), where
M is the torque from the diesel engine,
M1 is the torque to the front axle 4, and
M2 is the torque to the bogie axles.
We set M2/M1=(c2*Fz2/(c1*Fz1))''2=m
The square in the last-mentioned formula can be explained as follows: Fx/Fz=μ=k*slip, that is to say:
Fx=k*Fz*slip. But the value of k moreover increases linearly with Fz because the length of the contact area increases linearly with Fz. Increased contact length increases μ at the same slip.
The desired value of the torque to the front axle 4 is therefore: M1=M/(1+m)

The tractive power on the front axle in relation to the vertical load on the same axle is therefore determined in relation to the same ratio for other axles. Other conditions may lead to the relation between the ratios being changed in another way, which would mean a correction of the value m=M1/M2.

The constants c1 and c2 depend on the air pressure in the tire concerned.

The axle pressures Fz1 and Fz2 can, for example, be calculated from measured inclination in the longitudinal direction of the vehicle when we know whether the machine is empty or loaded.

An actual value of the torque which is supplied to the front axle 4 is detected by the regulating motor 42. The torque supplied to the front axle 4 is regulated so that the detected actual value of the torque moves toward the calculated desired value M1 of the torque.

To be precise, a rotation speed increase is supplied via the regulating motor 42 when the actual value of the torque is lower than the desired value of the torque.

The second control model therefore constitutes a feedback system.

If we measure inclination in the lateral direction of the vehicle part concerned and regulate on wheels, it is possible to compensate for inclination in the lateral direction as well.

The first control model is used for regulating the rotation speed of the longitudinal drive shaft 15 when the second control model gives a calculated value of said rotation speed which means that the calculated slip according to the first control model lies outside said limit, the rotation speed of the rotary element being regulated so that it follows said limit.

A preferred embodiment of the first control model (slip control) is described below.

At a given steering angle, the speed V of the ground under the front axle and rear axle is $$V1=R1*\psi$$

$$V2=R2*\psi$$

where R1 and R2 are curve radii of the respective axle/vehicle center and $\psi$ is the yaw angular speed at a given steering angle. We are considering the stationary case.

Therefore V1/V2=R1/R2

The same applies for the inner and outer wheels of the front axle with curve radii RIi and RIy. RIi=R1−S/2 and RIy=R1+s/2 where s is the track width.

$$V1y/V1i=R1y/R1i$$

But it is not sufficient to control the front wheels relative to one another; they have to be controlled relative to the speed of the rear axle, so $$V1y/V2=R1y/R2$$

and $V1i/V2=R1i/R2$

We consider the rotation speed of the drive line to front and rear wheels at a comparable transmission level, for example input pinion and the same axle ratio. Then the rotation speed at the input to the regulating element of the front axle is the same as the rotation speed to the rear axle, and we represent this with w2=w. The regulating element on the drive line branch to the front axle adds a rotation speed increase dw so that the output rotation speed from the regulating element becomes w1=w+dw. Let r1 and r2 be the rolling radii of the wheels and suppose that the transmission to ground which we have assumed to be the same for front and rear axle is implicit because the transmission disappears when we consider the quotient. The respective wheel speed is then proportional to r1*w1 or r2*w2.

The slip S on driving wheels is S=(r*w−V)/(r*w)=1−V/(r*w)

Therefore, for the respective ground contact point:

$$1-S1=V1/(w1*r1)$$

$$1-S2=V2/(w2*r2)$$

Divide and introduce the speeds of the ground as above $$(1-S1)/(1-S2)=(R1/R2)*(r2/r1)*(w2/w1)$$

Introduce as above $$w2=w$$

$$W1=w+dw$$

from which (1−S1)/(1−S2)=(R1/R2)*(r2/r1)*(w/(w+dw))

Transform to $$1+dw/w=(R1/R2)*(r2/r1)*(1-S2)/(1-S1)$$

which gives the necessary relative rotation speed increase dw/w.

The condition of the same slip gives dw/w=(R1/R2)*(r2/r1)−1

The slip at the ground contact point of the front axle 4:

$$S=1-V/[r(w+dw)]$$

By setting a value for a permitted deviation ($\delta$ s) of the slip from the calculated slip (Sber), that is to say the base value, the limit can be calculated as a function of the deviation value and the base value.

Figure 7:
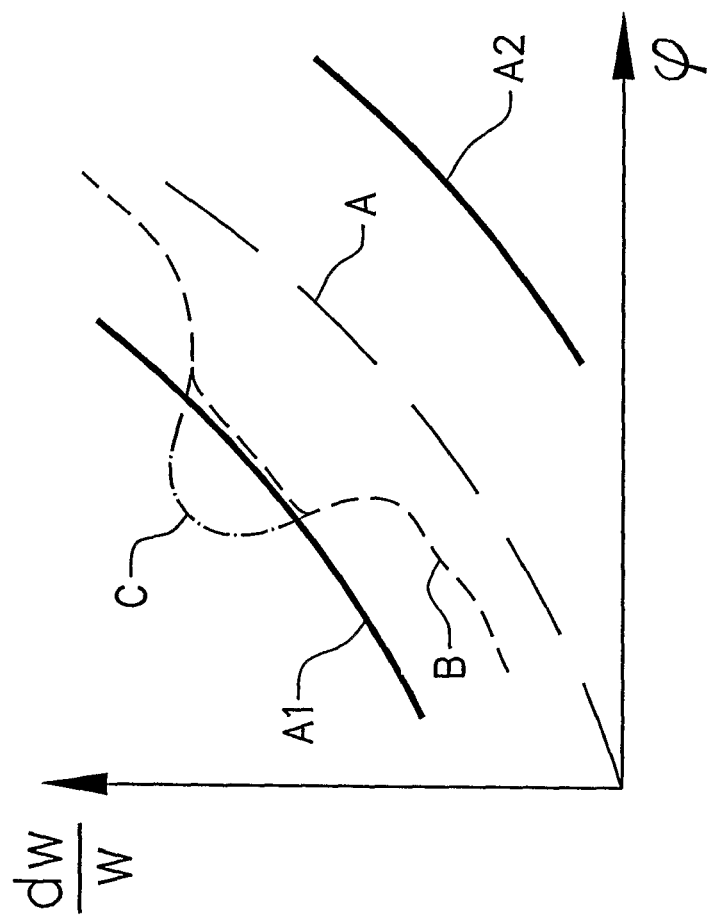
FIG. 7 illustrates diagrammatically a possible result of the regulating method in a graph.

FIG. 7 illustrates diagrammatically an example of results of the regulating method in a graph where an effect in the form of the steering angle $\phi$ is indicated on the x axis and a relative rotation speed increase dw/w is indicated on the y axis. The curve A indicates the calculated slip, and the curves A1 and A2 indicate the limits for permitted slip which are calculated with the aid of the first control model. The dashed line B corresponds to the rotation speed increase which is supplied to the front axle 4 via the regulating motor 42. The dot-dash line C corresponds to a rotation speed increase calculated with the second control model (friction control) but which lies outside the limit defined by the curve A1.

The method is preferably learning or in other words adaptive. If there are permanent or systematic errors in one or both regulating systems, the friction regulation (the second control model) will sometimes, often or always be in conflict with one of the limits for slip regulation (the first control model). This can cause unnecessarily great losses.

This can be eliminated by correcting the parameter values at stable deviations. The values are accumulated and processed statistically and, if the analysis shows a permanent discrepancy between the slip values of the two models, one or more parameter values are corrected in one of the models so that the discrepancy is reduced.

According to an example, time average and standard deviation are measured for the position of the friction regulation within the limits of the slip control when the application concerned is working. Long-term permanent deviation leads to the system gradually adjusting a suitable constant in the application concerned so that the conflict with the limits decreases. This can also be logged and fed back to the supplier for possible permanent correction of the cause of the deviations.

The values of the rotation speed of the rotary element calculated with the first control model are therefore saved during a period of operation, and the first model is corrected if an average for the values of the rotation speed of the rotary element calculated with the first control model lies too close to said limit, the correction of the limit being carried out so that the first model is activated less often.

The learning/adaptive system should also be dependent on application with regard to ground conditions etc.

In the method described above, rotation speed regulation is carried out during cornering, that is to say regulation in the horizontal plane. A corresponding difference in speed arises in the vertical plane when wheels or axles are mounted in some form of pendulum arm. When passing over obstacles, the rotation of the pendulum arm on spring action will increase or decrease the speed of rotation of the wheel depending on whether the point of rotation of the pendulum arm lies in front of or behind the wheel center. In the case of parallelogram mounting, no rotation occurs. However, the effects of the other system remain, for example increased length on the sloping part of the obstacle and the component in the longitudinal direction of the movement of the wheel in the vertical direction. According to a development of the above regulation method, the speed differences in both horizontal and vertical planes are compensated for simultaneously. When driving over obstacles, rotation speed is therefore added or subtracted according to the method described above.

An example of correction of rotation speed with regard to the vertical plane is correction for the angles of the pendulum axles in a vehicle with a bogie which is driven on uneven ground. With regulating units for both axles, it is possible to adapt to current speeds. It may be suitable to select as reference rotation speed the input shaft to the bogie before the regulating unit. This rotation speed will correspond closely to stable vehicle speed.

By always correcting automatically for the speed differences which normally occur (for example during driving in a bend or spring action), the drive line between different ground contact points can be connected. Slip difference and constrained torques are thus both eliminated. According to the preferred example, measured signals which control the rotation speed of the regulating motor are in the horizontal plane steering angles of the wheels and driving speed and in the vertical plane the spring movement, for example the angle of the pendulum arm, or of the bogie cradle.

According to a further version of the first control model (slip control), which is a variant of the version described above where the steering angle is detected and used for calculating the rotation speed increase, the rotation speed increase is determined with regard to at least one further operating parameter. Such an example is described below.

When the wheel pressure is increased, the contact area of the wheel with the ground is extended. The wheel pressure depends on inter alia tire pressure, load on the vehicle and acceleration/braking. The slip curve (friction as a function of slip, $\mu=k*s$, where s is slip on a driving wheel) becomes steeper when the wheel pressure increases and extends the contact area with the ground. According to the relationship $Fx/Fz=\mu$ (where Fx is driving power (or braking power) and Fz is axle pressure) and the factor $k=c*Fz$, from which $\mu=c*s*Fz$, $Fx=c*s*Fz\sim 2$. The constant c depends on air pressure in tires, and lower pressure increases c so that the slip curve becomes steeper in the case of lower vertical load Fz as well. With lower air pressure, the length of the contact area becomes greater of course.

When Fz increases on rear wheels when driving uphill or accelerating or Fz increases on front wheels when braking, the wheels with increased vertical load will bear too great a share of the longitudinal force and, with a risk of skidding, slide outward in the lateral direction. The maximum transmissible friction in the combination of x and y directions is of course roughly the same irrespective of the length of the contact area. A few control models are described briefly below:

1. Using lowest loss (best efficiency) at the ground engagement point gives the slip condition $S1/S2=1$. This is consistent irrespective of driving inclination. Owing to the fact that increased wheel pressure (on rear wheels on uphill inclination, on outer wheels in a bend) extends the contact area with the ground, the same slip gives increased utilized friction on wheels with increased load. This can lead to the reduced bearing capacity of these wheels for lateral force resulting in skidding. In order to avoid this, it is possible to have recourse to one or more of the additional control models below:

2. Using the same friction, $\mu 1/\mu 2=1$, on the wheels concerned, for calculating the rotation speed increase. As an example, this condition gives according to some calculations the rotation speed condition $S1/S2=2.5$, from which the rotation speed increase can be calculated.

3. The rotation speed increase is calculated for the same cornering stiffness. Slip can be controlled so that the utilized friction on the rear axle(s) is reduced, with the result that oversteer decreases.

Correction for the steering angle is carried out the whole time so that cornering functions like driving straight ahead with regard to rotation speed regulation. The two last-mentioned control models are therefore overlaid on the steering angle correction.

4. According to a further control model, the rotation speed increase is controlled so that the driving power is increased on outer wheels and decreased on inner wheels in a bend, in order to reduce the curve radius, primarily on surfaces with low friction.

Against the background of the above version, it can therefore be advantageous to control the rotation speed of the regulated rotary element so that the slip is different at two different ground engagement points. One or more further operating parameters are then detected, which indicate, for example, size of load, tire pressure, hill driving, acceleration or braking, and are used for calculating the rotation speed value.

It can be advantageous, for example, to redistribute the brake force between different ground engagement points (front/rear for example) during a braking operation. Deceleration is detected and redistribution is carried out with height of center of gravity as a variable parameter (empty or laden) and current brake distribution and set air pressure in tires as parameters. For safety reasons, it is important to compensate for the increased contact length of the tire at increased load (front wheels during hard braking) so that these wheels are not forced to transmit excessive brake force.

Figure 8:
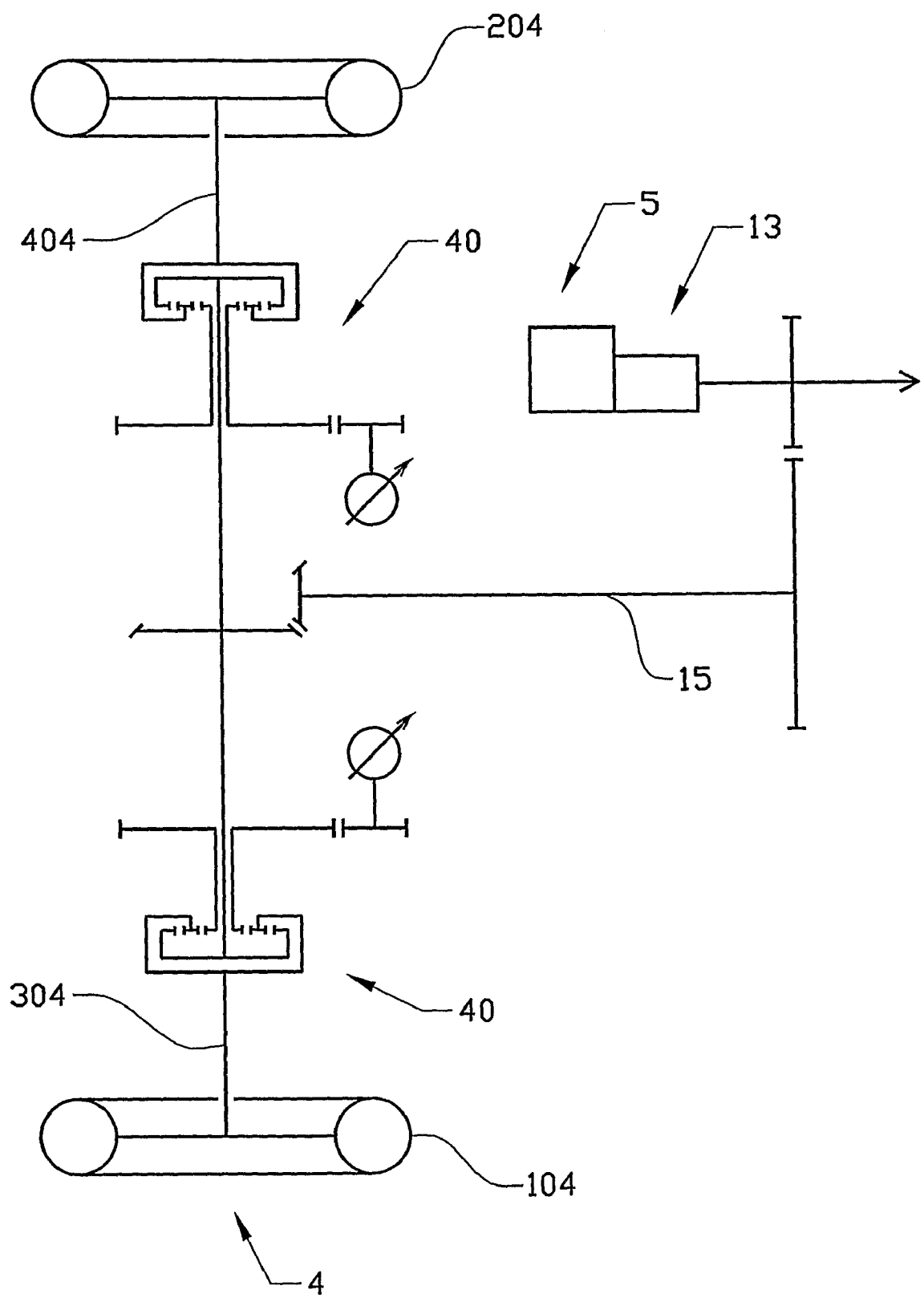
FIG. 8 shows diagrammatically part of the drive line of the frame-steered dumper comprising a regulating unit for each right and left front wheel for regulating the relative rotation speed between the wheels.

FIG. 8 shows diagrammatically part of the drive line of the frame-steered dumper 1 according to a second preferred embodiment. The front drive axle 4 comprises a regulating unit 40 for each right and left front wheel 104, 204 for individual regulation of the rotation speed which is supplied to each of the wheels. The regulation method described above is used for regulating the rotation speed of the wheels concerned.

In this case, the rotary element of which the rotation speed is regulated according to the method comprises a transverse drive shaft 304, 404 to the left and right wheel 104, 204 respectively.

In the embodiment according to FIG. 8 as well, the drive line can be said to be divided into a number of interconnected transmission branches, a first transmission branch of which transmits tractive power to the front axle 4 and a second transmission branch of which transmits tractive power to the bogie axles 9, 10. The regulating units 40 are adapted for varying the ratio in the first transmission branch and, to be precise, for varying the ratio to each of the front wheels 104, 204.

According to a further embodiment, a number of the driven wheel axles 4, 9, 10 of the vehicle are provided with said regulating units. In other words, a number of the transmission branches of the vehicle are provided with said regulating units. For example, each of the driven wheels can be provided with one of said regulating units.

If the method is used for rotation speed control for the purpose of driving the vehicle, it is possible according to an example to control the rotation speed so that the friction and/or the slip is essentially the same at all the ground engagement points in order to minimize losses.

If the method is used for rotation speed control for the purpose of braking the vehicle, it is possible according to an example to control the rotation speed so that safety (via avoiding skidding, reducing the risk of skidding etc.) and/or the characteristics of the vehicle (cornering, oversteer/understeer etc.) is/are improved.

It is possible to change between the two control models in a number of different ways determined by different conditions; said corridor is only one of a number. For example, when cornering with individual regulation of the front wheels, it is possible to reduce the width of the corridor in line with increased steering angle so that it approaches zero at a great steering angle, which means that the first control model (slip) takes over completely. This automatically provides greater driving power to the highly loaded outer wheel. If it is desired to drive even more on the outer wheel, we allow the second control model to take over regulation of the rotation speed again but within the limits permitted by the normal, that is to say wide, corridor of the first control model.

The corridor condition (the maximum) is always there in order to avoid wheelspin. The first control model corresponds to the differential lock, of course, as the second control model corresponds to the differential.

It is of course also possible to reduce the rotation speed of the rotary element via the regulating motor 42 when the actual value of the torque is greater than the desired value of the torque.

The invention is not to be regarded as being limited to the illustrative embodiments described above, but a number of further variants and modifications are conceivable within the scope of the patent claims below.

As an alternative to using the input rotation speed to the regulating unit 40 as reference rotation speed, it is possible to select the rotation speed of one of the ground engagement elements as a reference or a common rotation speed, for example from the drive engine or from the gearbox, or another non-regulated rotation speed in the drive line.

The drive line can furthermore also comprise (apart from mechanical) hydraulic or electric power transmission. For regulation, it is possible in entirely hydraulic or electric drive systems to measure output rotation speed instead, for example the rotation speed of the wheels, use this as reference rotation speed and control the fed-back rotation speed ratio between, for example, front and rear wheels in a bend so that, for example, the slip is the same. During entirely hydraulic or electric driving, control furthermore takes place directly in the individual drive motors by virtue of output torque being measured in the motor and with feedback adapted to the desired value which is determined by current conditions.

As an alternative/complement to using said limits (the corridor) in order to decide which control model is to be used for rotation speed control, the driver can be allowed to select the control model in certain situations. Furthermore, the method can allow the driver to give an additional input to detected operating parameters for the calculations in one or both control models. Furthermore, it is possible to conceive of further conditions having to be met for selection of control model, such as yaw angular speed when the system is to avoid a skid.

As mentioned above, the invention can be applied to vehicles running on rails, for example. Rail vehicles can have problems with slip when the friction against the rail is low. Such low friction can arise when there are wet leaves, ice, snow, mud or the like on the rail. In such a case, rotation speed control can be used between driven wheels of the rail vehicle/ train.

The invention can also be applied to a number of vehicles which are coupled together, for example a semi-trailer with drive to the wheels of the semitrailer, or a frame-steered dumper with a driven bogie car.

The invention claimed is:

1. A method for controlling rotation speed of at least one rotary element in the drive line of a vehicle, comprising
    repeatedly detecting at least one operating parameter, which operating parameter corresponds to an actual value of a torque in the drive line which is delivered to the rotary element,
    determining a vertical load from the vehicle toward the ground at a ground contact point of at least one of the ground engagement elements of the vehicle, the at least one ground engagement element being driven by the rotary element,
    determining a desired value of a torque to the rotary element as a function of friction against the ground of the at least one of the ground engagement element and as a function of the determined vertical load, and
    controlling the rotation speed of the rotary element so that the actual torque value moves toward the desired torque value.

2. The method as claimed in claim 1, the actual value of the torque delivered to the rotary element is detected.

3. The method as claimed in claim 1, wherein a rotation speed increase is supplied to the rotary element when the actual value of the torque is lower than the desired value of the torque.

4. The method as claimed in claim 1, wherein the actual value of the torque is detected by a regulating motor which is operationally coupled to the rotary element.

5. The method as claimed in claim 1, wherein the desired value of the torque to the rotary element is calculated.

6. The method as claimed in claim 1, wherein an operating parameter of the vehicle is detected and used for calculating the desired value of the torque.

7. The method as claimed in claim 1, wherein a torque from a drive source of the vehicle is determined and used for calculating the desired value of the torque.

8. The method as claimed in claim 1, wherein a desired tractive power is calculated on the basis of sensed operating parameters, which desired tractive power provides a desired value of the torque.

9. The method as claimed in claim 1, wherein the rotation speed of the rotary element is controlled on the basis of a determined torque distribution between at least two of the ground engagement elements of the vehicle.

10. The method as claimed in claim 1, wherein rotation speed control is carried out between a front drive shaft and a rear drive shaft in the vehicle so that the rotation speed of the front drive shaft is increased in relation to the rotation speed of the rear drive shaft during cornering.

11. The method as claimed in claim 1, wherein rotation speed control is carried out between a right and a left ground engagement element so that the rotation speed of the one of the right and the left ground engagement element with a larger curve radius is increased in relation to the rotation speed of the one of the right and the left ground engagement element with a smaller curve radius during cornering.

12. The method as claimed in claim 1, comprising controlling the rotation speed of the rotary element so that the rotation speed which is supplied to two different wheel engagement elements is varied.

13. The method as claimed in claim 1, wherein the rotation speed of the rotary element is controlled on the basis of the desired torque value, and the slip at the ground contact point of the ground engagement element is allowed to vary.

14. The method as claimed in claim 1, wherein a first control model is defined, with which at least one limit for permitted slip of the ground engagement element of the vehicle at its ground contact point is determined, and a rotation speed value corresponding to the slip determined is calculated, a second control model is defined, with which the torque to the ground engagement element is determined according to on the basis of the friction against the ground, and the rotation speed of the rotary element is controlled according to a result of the second control model as long as the slip at the ground contact point determined with the first control model is on a permitted side of the limit.

15. The method as claimed in claim 14, wherein the first control model is used for controlling the rotation speed of the rotary element when the second control model gives a calculated value of the rotation speed which means that the calculated slip according to the first control model lies outside the limit, the rotation speed of the rotary element is controlled so that it follows the limit.

16. The method as claimed in claim 14, wherein at least one operating parameter of the vehicle is detected repeatedly and used for calculating the limit according to the first control model.

17. The method as claimed in claim 14, wherein values of the limit is updated repeatedly according to the first control model.

18. The method as claimed in claim 14, wherein a steering angle of the vehicle is detected and used in the first control model for rotation speed control.

19. The method as claimed in claim 14, wherein speed of the vehicle is detected the limit is determined in the first control model as a function of the vehicle speed.

20. The method as claimed in claim 14, wherein the rotation speed of the rotary element is controlled, when the first control model is used, so that free rotation of the ground engagement element is counteracted and a torque delivered to the ground engagement element is allowed to vary.

21. The method as claimed in claim 14, wherein values calculated with at least one of the first and second control models are saved during a period of operation, and the models are corrected relative to one another if they provide slip values which show a permanent discrepancy between the models.

22. The method as claimed in claim 14, wherein one of the control models is selected on the basis of the operating conditions of the vehicle for controlling the rotation speed of the rotary element.

23. The method as claimed in claim 14, wherein one of the control models is selected repeatedly and automatically.

24. The method as claimed in claim 1, wherein rotation speed control is carried out for driving the rotary element.

25. The method as claimed in claim 1, wherein rotation speed control is carried out for braking the rotary element.

26. A method for controlling rotation speed of at least one rotary element in the drive line of a vehicle, comprising
repeatedly detecting at least one operating parameter, which operating parameter corresponds to an actual value of a torque in the drive line which is delivered to the rotary element,
determining a desired value of a torque to the rotary element based on friction against the ground of at least one of the ground engagement elements of the vehicle, which ground engagement element is driven via the rotary element,
controlling the rotation speed of the rotary element so that the actual value moves toward the desired value,
wherein rotation speed control is carried out between a front drive shaft and a rear drive shaft in the vehicle so that the rotation speed of the front drive shaft is increased in relation to the rotation speed of the rear drive shaft during cornering and tractive power on the front drive shaft in relation to the vertical load on the front drive shaft is controlled to a given ratio relative to tractive power on the rear drive shaft in relation to a vertical load on the rear drive shaft.

27. A method for controlling rotation speed of at least one rotary element in the drive line of a vehicle, comprising
repeatedly detecting at least one operating parameter, which operating parameter corresponds to an actual value of a torque in the drive line which is delivered to the rotary element,
determining a desired value of a torque to the rotary element based on friction against the ground of at least one of the ground engagement elements of the vehicle, which ground engagement element is driven via the rotary element,
controlling the rotation speed of the rotary element so that the actual value moves toward the desired value,
wherein a first control model is defined, with which at least one limit for permitted slip of the ground engagement element of the vehicle at its ground contact point is determined, and a rotation speed value corresponding to the slip determined is calculated, a second control model is defined, with which the torque to the ground engagement element is determined according to on the basis of the friction against the ground, and the rotation speed of the rotary element is controlled according to a result of the second control model as long as the slip at the ground contact point determined with the first control model is on a permitted side of the limit, and wherein a reference rotation speed is determined for a part of the drive line which is on the opposite side of the rotary element in relation to the ground engagement element driven by it, and control of the rotation speed with the first control model is carried out in relation to this reference rotation speed.

28. The method as claimed in claim 27, wherein at least one rotation speed is detected for a rotary element in the drive line part, and this detected rotation speed is used as the reference rotation speed.

29. A method for controlling rotation speed of at least one rotary element in the drive line of a vehicle, comprising
repeatedly detecting at least one operating parameter, which operating parameter corresponds to an actual value of a torque in the drive line which is delivered to the rotary element,
determining a desired value of a torque to the rotary element based on friction against the ground of at least one of the ground engagement elements of the vehicle, which ground engagement element is driven via the rotary element, controlling the rotation speed of the rotary element so that the actual value moves toward the desired value, wherein a first control model is defined, with which at least one limit for permitted slip of the ground engagement element of the vehicle at its ground contact point is determined, and a rotation speed value corresponding to the slip determined is calculated, a second control model is defined, with which the torque to the ground engagement element is determined according to on the basis of the friction against the ground, and the rotation speed of the rotary element is controlled according to a result of the second control model as long as the slip at the ground contact point determined with the first control model is on a permitted side of the limit, and wherein a deviation value is set in the first control model for a permitted deviation of the slip from a base value, which base value is dependent on the steering angle of the vehicle, and at least one limit is calculated as a function of the deviation value and the base value.

30. The method as claimed in claim 29, wherein the deviation value is varied depending on the ground conditions.

31. The method as claimed in claim 29, wherein a value for a rotation speed increase for the rotary element is calculated on the basis of the steering angle detected and the deviation value.

32. A method for controlling rotation speed of at least one rotary element in the drive line of a vehicle comprising repeatedly detecting at least one operating parameter, which operating parameter corresponds to an actual value of a torque in the drive line which is delivered to the rotary element, determining a desired value of a torque to the rotary element based on friction against the ground of at least one of the ground engagement elements of the vehicle, which ground engagement element is driven via the rotary element, controlling the rotation speed of the rotary element so that the actual value moves toward the desired value, wherein a first control model is defined, with which at least one limit for permitted slip of the ground engagement element of the vehicle at its ground contact point is determined, and a rotation speed value corresponding to the slip determined is calculated, a second control model is defined, with which the torque to the ground engagement element is determined according to on the basis of the friction against the ground, and the rotation speed of the rotary element is controlled according to a result of the second control model as long as the slip at the ground contact point determined with the first control model is on a permitted side of the limit, and wherein values of the rotation speed of the rotary element calculated with the first control model are saved during a period of operation, and the first model is corrected if an average for the values of the rotation speed of the rotary element calculated with the first control model lies too close to the limit, correction of the limit being carried out so that the first model is activated less often.

* * * * *